United States Patent Office  3,202,655
Patented Aug. 24, 1965

3,202,655
6-[α-SUBSTITUTED-α-(2- OR 3-HETEROCYCLIC)
ACETAMIDO]PENICILLANIC ACID AND
NONTOXIC SALTS THEREOF
Yvon G. Perron, 7711 Du Mail Ave., Ville d'Anjou,
Quebec, Canada, and Lee C. Cheney, Woodchuck Hill
Road, R.D., Fayetteville, N.Y.
No Drawing. Filed July 5, 1963, Ser. No. 293,135
5 Claims. (Cl. 260—239.1)

This application is a continuation-in-part of our prior copending applications Serial No. 190,781, filed April 27, 1962, and now abandoned, and Serial No. 190,795, filed April 27, 1962, and now abandoned.

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and, more particularly relates to 6-[α-substituted-α-(2- or 3-heterocyclic)acetamido]-penicillanic acid and nontoxic salts thereof.

Antibacterial agents such as benzylpenicillin have proved highly effective in the past in the therapy of infections due to Gram-positive bacteria but such agents suffer from the serious drawbacks of being unstable in aqueous acid, e.g. upon oral administration, and of being ineffective against numerous strains of bacteria, e.g. most Gram-negative bacteria. The compounds of the present invention are particularly useful in that they possess potent antibacterial activity against both Gram-positive and Gram-negative bacteria upon either parenteral or oral administration and also exhibit resistance to destruction by acid and penicillinase.

There is provided, according to the present invention, a member selected from the group consisting of the acids having the formula (I) 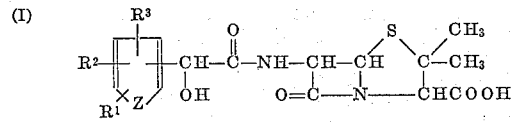

wherein Z is a member selected from the group consisting of sulfur and oxygen and wherein $R^1$, $R^2$ and $R^3$ are each a member selected from the group consisting of hydrogen, chloro, bromo, fluoro, iodo, nitro, (lower)alkyl, (lower)alkoxy, (lower)alkylthio, di(lower)alkylamino, (lower)alkanoylamino, (lower)alkanoyl, and (lower)alkylsulfonyl; and the pharmaceutically acceptable nontoxic carboxylic acid salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N′-dibenzylethylenediamine, dehydroabietylamine, N,N′-bis-dehydroabietylethylenediamine, N-(lower)alkylpiperidine [e.g., N-ethylpiperidine] and other amines which have been used to form salts with benzylpenicillin. Also included within the scope of the present invention are easily hydrolyzed esters or amides which are converted to the free acid form by chemical or enzymatic hydrolysis. The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. "(lower)alkoxy," it refers to the alkyl portion of such group which is therefore as described above in connection with "(lower)alkyl."

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower)alkanoyl includes acetyl, propionyl, butyryl, etc.; (lower)alkylsulfonyl includes methylsulfonyl, ethylsulfonyl, hexylsulfonyl, etc.; di(lower)alkylamino includes dimethylamino, diethylamino, ethylmethylamino, etc.

A preferred group of compounds of Formula I are those in which at least one of $R^1$, $R^2$ and $R^3$ is hydrogen; thus the heterocyclic moiety of such preferred compounds can be represented by the formula (II) 

wherein Z, $R^1$ and $R^2$ each have the meaning set forth above. Of these preferred compounds, a preferred subgroup is that wherein $R^1$ and $R^2$ are selected from the group consisting of hydrogen, (lower)-alkoxy and chloro and wherein Z is sulfur and the heterocyclic moiety is attached at its 2-position to the acetamido grouping (i.e., the heterocyclic moiety is a substituted or unsubstituted 2-thienyl group).

There is also provided by the present invention a group of α-keto penicillins having the formula (III) 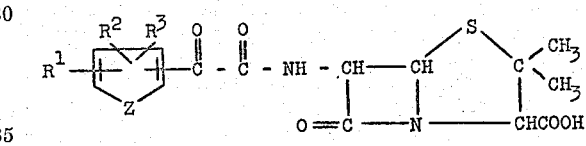

wherein Z, $R^1$, $R^2$ and $R^3$ each have the meaning set forth above in connection with the compounds of Formula I above, and the carboxylic acid salts thereof. A preferred group of these α-keto penicillins are those in which the heterocyclic moiety is as defined above in Formula II.

These α-keto penicillins, which are also useful antibacterial agents, are also useful in the preparation of α-hydroxy-α-(2- or 3-heterocyclic)acetamido penicillins. These α-keto penicillins of the Formula III above may be prepared by the reaction of 6-aminopenicillanic acid, preferably in the form of a neutral salt such as the sodium, potassium or triethylamine salt, with an acid chloride having the formula (IV) 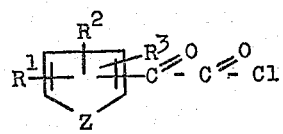

wherein Z, $R^1$, $R^2$ and $R^3$ each has the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid. The α-keto penicillins of the present invention can also be prepared by the use of an acid azide or a carbodiimide reagent as described by Sheehan and Hess, J. Amer. Chem. Soc., 77, page 1067 (1955). General methods for the preparation and purification of the α-keto penicillins of the present invention according to the mixed anhydride procedure and the acid chloride procedure are described and illustrated in U.S. Patent Nos. 2,941,995, 2,996,501, 2,985,648 and 2,951,839.

The substituted α-(2- or 3-heterocyclic)-α-keto acetic acids and the corresponding acetyl chlorides which are used in the preparation of the compounds of the present invention may be prepared by a variety of synthetic methods which are common in the art. Most of these starting compounds are described in the prior art and many of them are commercially available. Detailed discussions of methods for the preparation of these starting materials are found in such reference works as the "Chemistry of Carbon Compounds," E. H. Rodd, editor (1956), Elsevier Publishing Company. The preparation of 2-thienyl-glyoxylic acid chloride is illustrative of such methods of preparation and is set forth in the examples below. The acids may be prepared according to the procedures described generally in J. Amer. Chem. Soc., 66, 1645–1648 (1944), by means of a Friedel-Crafts type reaction with the appropriate thiophene or furan compound and a chloride of oxalic acid. The preparation of 2-furylglyoxylic acid is described in Chem. Ber., 87, pages 276–282.

The preferred α-hydroxypenicillins of the present invention as pointed out in Formula I above, are prepared by first preparing the appropriate α-keto penicillin as described above and then contacting such α-keto penicillin or a salt thereof in a liquid medium with at least one equivalent of a member selected from the group consisting of sodium borohydride, sodium trimethoxyborohydride and potassium borohydride to produce the corresponding hydroxypenicillin and salts thereof. More specifically, the process for the production of hydroxypenicillins comprises contacting in a substantially aqueous medium at a pH greater than about 7 and at a temperature in the range of about —5° C. to about 40° C. a member selected from the group consisting of an α-keto penicillin described in Formula III above and salts thereof with from 1 to 12 equivalents of a member selected from the group consisting of sodium borohydride, sodium trimethoxyborohydride and potassium borohydride to produce the corresponding hydroxypenicillin and salts thereof. When used as intermediates in the chemical process for the production of the α-hydroxypenicillins, the α-keto penicillins of Formula III may be used either in the acid form or as a salt; it is not necessary that the salts be nontoxic, but the cation should be one which does not interfere with the chemical reduction reaction.

A preferred process for the preparation of the α-hydroxypenicillins of the present invention comprises contacting in a substantially aqueous medium at a pH greater than about 7 and at a temperature in the range of about —5° C. to about 40° C. a member selected from the group consisting of α-keto penicillins having the formula (V)

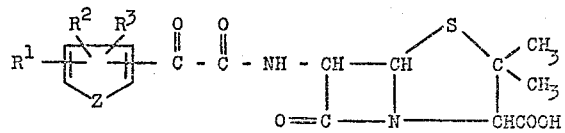

wherein Z, $R^1$, $R^2$ and $R^3$ have the meaning set forth above, and salts thereof with from 1 to 12 equivalents of a member selected from the group consisting of sodium borohydride and potassium borohydride to produce a member selected from the group consisting of the corresponding hydroxypenicillin and salts thereof.

In the preparation of the preferred penicillin of this invention, 6-[α-hydroxy-α-(2 - thienyl)acetamido]penicillanic acid, the appropriate α-keto penicillin, the potassium salt of 6-(2-thienylglyoxylamido)penicillanic acid, is first prepared by the acid chloride procedure which is described above and which is illustrated in the following examples and this α-keto penicillin is then reduced with sodium borohydride, as illustrated in the following examples. The preparation of the borohydrides and certain methods of their use are described in United States Patent No. 2,683,721.

Another excellent method whereby the α-hydroxypenicillins of this invention may be prepared involves the reaction of 6-aminopenicillanic acid with an α-hydroxy acid having the formula (VI)

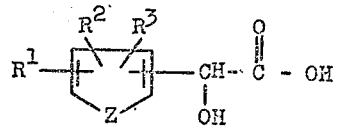

wherein Z, $R^1$ and $R^2$ and $R^3$ each has the meaning set forth above, in the presence of a carbodiimide. This method of forming the α-hydroxypenicillins, which does not require the formation of the corresponding α-keto penicillin as an intermediate, facilitates the formation of one of the pure diastereoisomers of the compounds of this invention. The reaction may be carried out by adding a solution of the carbodiimide, such as N,N'-dicyclohexylcarbodiimide, in dioxane to a solution of the sodium salt of 6-aminopenicillanic acid in water and dioxane.

There is also provided according to the present invention the compounds of the formula (VII)

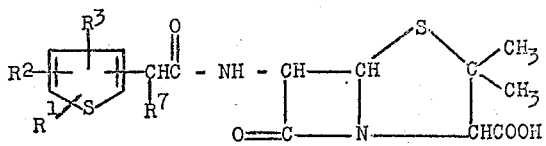

wherein $R^1$, $R^2$ and $R^3$ are as defined above in connection with Formula I and wherein $R^7$ is a member selected from the group consisting of (lower)alkyl and phenyl, and the pharmaceutically acceptable nontoxic salts thereof.

The penicillins of Formula VII may be prepared by the reaction of 6-aminopenicillanic acid, preferably in the form of a neutral salt such as the sodium, potassium or triethylamine salt, with an α-(2- or 3-thienyl)-α-substituted acid chloride having the formula (VIII)

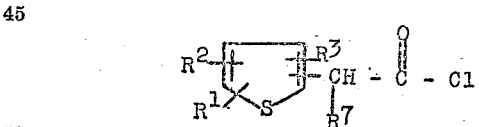

wherein $R^1$, $R^2$, $R^3$ and $R^7$ each has the meaning set forth above, or its functional equivalent as an acylating agent for a primary amino group. Such equivalents include the corresponding acid bromides, acid anhydrides and mixed anhydrides with other carboxylic acids, including monoesters and particularly lower aliphatic esters, of carbonic acid.

In addition, an acid azide or an active ester or thioester, (e.g. with p-nitrophenol, thiophenol, thioacetic acid), may be used or the free acid itself may be coupled with 6-aminopenicillanic acid by the use of enzymes or of a carbodiimide reagent [cf. Sheehan and Hess, J. Amer. Chem. Soc., 77, 1067 (1955)].

Another generally useful equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential.

The methods for carrying out these reactions to produce a penicillin and the methods used to isolate the penicillins so produced are well-known in the art. General methods for the preparation and purification of the pencillins of the present invention according to the mixed anhydride procedure and the acid chloride procedure are described and illustrated in U.S. Patents Nos. 2,941,995, 2,996,501 and 2,951,839.

The α-carbon atom of the acyl group (to which the α-hydroxyl or $R^7$ group is attached) is an asymmetric carbon atom and the compounds of this invention can therefore exist in two optically active isomeric forms (the D- and L-diastereoisomers), as well as in a mixture of the two optically active forms; all such isomeric forms of the compounds are included within the scope of the present invention. Also included within the scope of the present invention are easily hydrolyzed esters which are converted to the free acid form by chemical or enzymatic hydrolysis.

It should be noted in connection with the foregoing consideration of the diastereoisomers of this invention that many isomers other than the two caused by the asymmetric carbon of the side chain are possibly due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

In the exemplified process for the preparation of the compounds of Formulae I and III and VII above, the compounds are sometimes in aqueous solution in the form of their sodium or potassium salt. These compounds in the aqueous phase can then be converted to the free acid, preferably in the cold under a layer of ether by the addition of dilute mineral acid, e.g. 5 N $H_2SO_4$ to pH 2. The free acid can then be extracted into a water-immiscible, neutral organic solvent such as ether, the extract washed with water quickly in the cold, if desired, and dried, as with anhydrous $Na_2SO_4$ and the free acid recovered from the ethereal solution. The product in the ethereal extract in its free acid form can then be converted to any desired metal or amine salt, particularly the pharmaceutically acceptable nontoxic amine salts described above, by treatment with the appropriate base, e.g. a free amine such as procaine base or a solution of potassium 2-ethylhexanoate in dry n-butanol. These salts are usually insoluble in solvents such as ether and can be recovered in pure form by simple filtration.

The following examples will serve to illustrate this invention without limiting it thereto.

EXAMPLE 1

*Preparation of α-thienylglyoxylic acid*

A mixture of thiophene (1.0 mole; 94.0 g.) ethyl oxalyl chloride (1.0 mole; 137.0 g.) and 1500 ml. of tetrachloroethane is cooled to —5° C. and aluminum trichloride is added portion-wise over a 45-minute period. The mixture is then allowed to come to room temperature and stirred for three hours. It is then poured into a mixture of ice and HCl. The organic layer is carefully separated and shaken, successively, with 6 N HCl, 5 portions of water and once with a dilute sodium carbonate solution. The organic layer is then dried over $Na_2SO_4$, filtered and stripped of solvents by distillation. The product, ethyl α-thienylglyoxylic acid, has a boiling point of 90–91° C. at a pressure of 0.15 mm. of mercury.

A reaction mixture containing ethyl α-thienylglyoxalate (64.4 gm.; 0.349 mole) sodium carbonate monohydrate (116.0 gm.; 0.95 mole) in 150 ml. ethanol and 500 ml. water is refluxed for 12 hours. After refluxing, the reaction mixture is boiled with charcoal and filtered, and the filtrate evaporated to dryness. The solid white residue is dissolved with cold 6 N hydrochloric acid and extracted with three 300 ml. portions of ether. The combined extracts are then dried and stripped of ether to yield a solid which is recrystallized twice from boiling benzene. The resulting crystalline product, α-thienylglyoxylic acid, is found to weigh 19.0 gm. and to melt at 88–90° C. which is in substantial agreement with the pertinent literature (JACS, 66, 1646 (1944)).

EXAMPLE 2

*Part A.—Preparation of α-thienylglyoxylic acid chloride*

A reaction mixture containing thionyl chloride (24 gm.; 0.2 mole), α-thienylglyoxylic acid (16 gm.; 0.1 mole) in 100 ml. dichloromethane and 0.5 cc. pyridine is gently refluxed for 7 hours and then filtered. The solvents and excess thionyl chloride are removed from the filtrate by evaporation under reduced pressure. The resulting product, α-thienylglyoxylic acid chloride, is recovered as an oil.

*Part B.—Preparation of potassium 6-(2-thienylglyoxylamido)penicillanate*

A solution of the 2-thienylglyoxylic acid chloride (prepared as described in Part A above) in 100 ml. of acetone is added dropwise to a chilled and vigorously-stirred solution (—5° C.) of 6-aminopenicillanic acid (21.6 gm.; 0.1 mole) and sodium bicarbonate (42.0 gms.; 0.5 mole) in 200 ml. of water and 100 ml. of acetone. After completion of the addition of the acid chloride solution, the reaction mixture is stirred at room temperature for two hours. The reaction mixture is then diluted with 200 ml. of water and is extracted twice with methyl isobutyl ketone. The extracted aqueous layer is cooled and acidified to pH 2 with 6 N $H_3PO_4$ (40%) and then is extracted once more with methyl isobutyl ketone. The extract which contains the desired product, 6-(2-thienylglyoxylamido)penicillanic acid, is washed with water and dried over anhydrous sodium sulfate. Treatment of the extract with 50 ml. of a 40% butanolic solution of potassium 2-ethylhexanoate results in the precipitation of some of the potassium salt of the above unreacted starting acid. The methyl isobutyl ketone solution is then further dried by azeotropic distillation of three-quarters of the methyl isobutyl ketone under reduced pressure and diluted with dry ether (one liter) which precipitates the potassium salt of the penicillin. This potassium salt is dried in vacuo over $P_2O_5$ and recovered as a water-soluble powder, and found to weigh 3.1 grams, to contain the β-lactam structure as shown by infrared analysis and to inhibit *Staph. aureus* Smith at concentrations of 0.001 percent by weight.

EXAMPLE 3

*Preparation of potassium 6-[α-hydroxy-α-(2-thienyl)acetamido]penicillanate*

To an ice-cold solution of potassium 6-(2-thienylglyoxylamido)penicillanate (2.1 gm.; 0.005 mole) in 15 ml. distilled water and sodium acetate trihydrate (1.0 gm.) there is added $NaBH_4$ (0.21 gm.; 0.005 mole) in portions such that the temperature did not exceed 10° C. and no reaction mixture is lost by foaming. During the addition the pH was kept at about 8 by the intermittent dropwise addition of glacial acetic acid. Ether is added intermittently as needed to prevent foaming by lowering surface tension. After addition of the $NaBH_4$ is completed, the mixture is stirred in the ice bath for about 10 minutes, then one-half hour with the ice bath removed and transferred to a separatory funnel and extracted with ether. The aqueous phase is then layered with 75 ml. of ether and is then adjusted to pH 2 by the addition of 40% $H_3PO_4$ while being maintained cold in an ice bath. The ethereal extract containing the product, 6-[α-hydroxy-α-(2-thienyl)acetamido]penicillanic acid, is then washed with two portions of water and dried briefly over anhydrous Na₂SO₄ and filtered. The potassium salt is formed by the addition of 3 ml. of 40% potassium 2-ethylhexanoate in n-butanol. Addition of an additional 50 ml. of n-butanol causes the product to precipitate as the potassium salt with crystallization induced by scratching. The precipitate is washed with 10 cc. n-butanol and 10 cc. acetone and then dried under reduced pressure. The potassium 6-[α-hydroxy-α-(thienyl)acetamido]-penicillanate is found to weigh 1.0 gm., to contain the β-lactam structure and to differ from the starting keto penicillin as shown by infrared analysis (absence of

band in the infra-red spectrum), to melt with decomposition at 228° C., to inhibit *Staph. aureus* Smith at a concentration of 0.05 mcg./ml. and to exhibit versus *Staph. aureus* Smith upon intramuscular injection in mice a CD₅₀ of 0.6 mcg./kg.

EXAMPLE 4

*Preparation of 2-furylglyoxylic acid chloride*

A solution containing redistilled furan (68.05 gm.; 1.0 mole), 200 ml. dry diethyl ether, and 200 ml. petroleum ether (mixed lower alkanes, principally n-hexane, boiling at about from 60–68° C., available commercially under the trademark "Skellysolve B" from Skelly Oil Company) is added slowly over a period of one hour to a solution containing oxalyl chloride (126.9 gm.; 1.0 mole), 750 ml. dry ether and 750 ml. petroleum ether. The latter solution is maintained under nitrogen at —30° C. in an acetone-Dry Ice bath throughout the addition of the pyrrole solution. After the addition is completed, the reaction mixture is stirred for an additional half hour at temperatures ranging from —30° C. to 0° C. and thereafter the solvents are removed by distillation under reduced pressure. The product, 2-furylglyoxylic acid chloride, precipitates upon removal of solvents, is collected by filtration, washed with petroleum ether and dried.

EXAMPLE 5

*Preparation of the potassium salt of 6-[α-(2-furyl)glyoxylamido]penicillanic acid*

A solution of 2-furylglyoxylic acid chloride (21.9 gm.; 0.2 mole) in 200 ml. of acetone is added dropwise to a chilled solution (—5° C.) of 6-aminopenicillanic acid (43.2 gm.; 0.2 mole) and sodium bicarbonate (84.0 gm.; 1.0 mole) in 400 ml. of water and 200 ml. of acetone. After completion of the addition of the acid chloride solution, the reaction mixture is stirred at —5° C. for one-half hour and at room temperature for one hour. The reaction mixture is then diluted with 500 ml. of water and is extracted twice with methyl isobutyl ketone. The extracted aqueous layer is cooled and acidified to pH 2 with 6 N H₃PO₄ (40%) and then is extracted once with methyl isobutyl ketone. The extract which contains the desired product, 6-[α-(2-furyl)glyoxyamido] penicillanic acid, is washed with water and dried over anhydrous sodium sulfate.

Treatment of the dried extract with 100 ml. of a 50% butanolic solution of potassium 2-ethylhexanoate results in the precipitation of the potassium salt of the above starting acid and the solids are filtered off and discarded. The filtrate which is first dried by azeotropic distillation of part of the methyl isobutyl ketone is diluted with 3 liters of dry ether whereupon the product precipitates and is collected by filtration, washed with dry ether and petroleum ether and dried in vacuo over P₂O₅. The product, potassium 6-[α-(2-furyl)glyoxylamido]penicillanic acid is found to contain the β-lactam structure as shown by infrared analysis and to inhibit *Staph. aureus* Smith at concentrations of 0.001% by weight.

EXAMPLE 6

*Preparation of potassium 6-[α-hydroxy-α-(2-furyl)acetamido]penicillanate*

To an ice-cold solution of 6-(2-furylglyoxylamido) penicillanic acid (75 gm.; 0.2 mole) in 500 ml. distilled water and sodium acetate trihydrate (27.2 gm.) there is added NaBH₄ (7.4 gm.; 0.2 mole) in portions such that the temperature does not exceed 10° C. and no reaction mixture is lost by foaming. During the addition, which requires about one hour, the pH is kept at about 8 by the dropwise addition of glacial acetic acid. Ether is added intermittently as needed to prevent foaming by lowering surface tension. After addition of the NaBH₄ is completed, the mixture is stirred in the ice bath for about 10 minutes, then ½ hour with the ice bath removed and transferred to a separatory funnel and extracted with 500 ml. ether. The aqueous phase is then layered with 400 ml. of ether and is then adjusted to pH 2 by the addition of 40% H₃PO₄ while being maintained cold in an ice bath. The ethereal extract containing the product, 6[α-hydroxy-α-(2-furyl)acetamido]penicillanic acid, is then washed with two 400 ml. portions of water and dried briefly over anhydrous Na₂SO₄ and filtered. The potassium salt is formed and precipitated as an oil by the addition of about 40 ml. of 40% potassium 2-ethyl hexanoate in n-butanol. The solvent is decanted and the oil triturated with n-butanol whereupon the salt crystallizes. The potassium 6-[α-hydroxy-α-2-furyl)acetamido] penicillanate is collected by filtration. The product is then dissolved in a mixture of 200 ml. n-butanol and 20 ml. water. The water is removed from the solution by azeotropic distillation and the product precipitates, is collected by filtration and found to contain the β-lactam structure and to differ from the starting keto penicillin as shown by infrared analysis (absence of

band in the infrared spectrum), and to inhibit *Staph. aureus* Smith at a concentration of 0.001% by weight.

EXAMPLE 7

*Part A.—Preparation of α-(2-thienyl)glyoxylic acid*

To a solution of 2-acetylthiophene (100.8 g.; 0.8 mole) in 600 ml. of pyridine at 60° C. is added selenium dioxide (137 g.; 1.24 mole). The mixture is stirred vigorously and heated slowly to 90° C. at which point an exothermic reaction begins. When the temperature of the reaction exceeds 100° C., the mixture is cooled. After about one-half hour, external heat is again applied to the reaction mixture and the mixture is maintained at 90° C. for two hours. The mixture is then cooled to 20° C., filtered through filter aid (infusorial earth—available under the trade name "Super-Cel") and diluted with 600 ml. of water. The pyridine is removed by steam distillation and the resulting hot aqueous solution is treated with charcoal, filtered and concentrated to about 200 ml. by evaporation. This solution is cooled, acidified to pH 1.5 to 2.0 with 40% H₃PO₄, saturated with salt and extracted with three 300 ml. portions of ether. The combined extracts are washed with three 50 ml. portions of water and dried over anhydrous Na₂SO₄ at 5° C. for two hours. The ether solution is concentrated in vacuo after filtering and further dried by adding 200 ml. of benzene and azeotropically distilling the water from the solution. The light yellow oil which remains is then dissolved in 700 ml. of hot benzene and seeded with a small amount of α-(2-thienyl)glyoxylic acid obtained in Example 1 above. Upon cooling, there is obtained 79 g. of light yellow crystals of α-(2-thienyl)glyoxylic acid having a melting point of 91° C. which is in substantial agreement with the pertinent literature [J.A.C.S. 66, 1646 (1944)]. By concentrating the filtrate, another 18 g. of α-(2-thienyl)glyoxylic acid is obtained, giving a total yield of 97.0 g. or 83% of theoretical.

Part B.—Preparation of α-(2-thienyl)glyoxylic acid chloride

A mixture of α-(2-thienyl)glyoxylic acid (70 g.), 100 ml. of redistilled thionyl chloride and two drops of pyridine were slowly heated with shaking to about 60° C. at which point a vigorous reaction begins. When the heat of reaction subsides (after about five minutes), the reaction mixture is heated at reflux for one hour. The excess thionyl chloride is then removed under reduced pressure and the product, α-(2-thienyl)glyoxylyl chloride, is distilled at 96° C. under a pressure of 9 mm. of mercury. The product (70 g.), a yellow oil, crystallizes on standing to a yellow solid having a melting point of 33–34° C.

Part C.—Preparation of potassium 6-[α-(2-thienyl)-glyoxylamido]penicillanate A solution of the α-(2-thienyl)glyoxylic acid chloride (71.6 gm.; 0.41 mole) (prepared as described in Part B above) in 300 ml. of acetone is added dropwise to a chilled and vigorously-stirred solution (−5° C.) of 6-aminopenicillanic acid (86.4 gm.; 0.4 mole) and sodium bicarbonate (118.0 gm.; 2.0 mole) in 600 ml. of water and 300 ml. of acetone. After completion of the addition of the acid chloride solution, the reaction mixture is stirred at room temperature for one hour. The reaction mixture is then extracted with two liters of methyl isobutyl ketone. The extracted aqueous layer is cooled and acidified to pH 2 with 6 N $H_3PO_4$ (40%) and then is extracted with 1400 ml. of methyl isobutylketone. The methyl isobutyl ketone layer is then extracted with two 1-liter portions of water and two 4 ml. saturated salt solutions. The methyl isobutyl ketone extract is then dried by azeotropic distillation to a volume of 400 ml. and diluted with dry ether. The potassium salt, 6-[α-(2-thienyl)glyoxylamido]penicillanic acid (80 g.), is dried in vacuo over $P_2O_5$ and recovered as a water-soluble powder, found to weigh 3.1 grams, to contain the β-lactam structure as shown by infrared analysis and to inhibit *Staph. aureus* Smith at concentrations of 0.001% by weight.

EXAMPLE 8

Preparation of potassium 6-[α-hydroxy-α-(2-thienyl)-acetamido]penicillanate To an ice-cold solution of potassium 6-[α-(2-thienyl)-glyoxylamido]penicillanate (78 gm.; 0.2 mole), prepared in Part C of Example 7, 500 ml. of water and 100 ml. of ether and sodium acetate trihydrate (40 gm.; 0.3 mole) there is added $NaBH_4$ (11.1 gm.; 0.3 mole) in small portions over a period of about one hour. During the addition the pH is kept at about 8–9 by the dropwise addition of glacial acetic acid. After addition of the $NaBH_4$ is completed, the mixture is allowed to slowly reach 20° C. over a one-hour period. Acetic acid is added periodically to maintain the pH at about 8. The mixture is then extracted with ether and the ether extract is discarded. The aqueous phase is then layered with 500 ml. of ether and then adjusted to pH 2 by the addition of 40% $H_3PO_4$ while being maintained cold in an ice bath. The ethereal extract containing the product, 6-[α-hydroxy-α-(2-thienyl)acetamido]penicillanic acid, is then washed with three 100 ml. portions of water and dried briefly over anhydrous $Na_2SO_4$ and filtered. The potassium salt is formed by the addition of 5% potassium 2-ethylhexanoate and n-butanol until no more cloudiness occurs. The reaction mixture is cooled for 15 minutes in an ice bath and the ether decanted. Addition of an additional 500 ml. of n-butanol causes the product to precipitate as the potassium salt with crystallization induced by scratching. The precipitate is recovered by filtration after standing in ice for one hour. The product is washed with acetone, dried and subsequently recrystallized five times from 400 ml. portions of wet butanol (10% water by volume). The product obtained after the last recrystallization, a diastereoisomer of potassium 6-[α-hydroxy-α-(2-thienyl)acetamido]penicillanate, weighs 3.3 g., contains the β-lactam structure as determined by infrared analysis, has an optical rotation of +253°, differs from the starting keto penicillin as shown by infrared analysis (absence of

band in the infrared spectrum), is found to melt with decomposition at 234° C., to inhibit *Staph. aureus* Smith at a concentration of 0.1 mcg./ml. and to exhibit versus *Staph. aureus* Smith upon intramuscular injection in mice a $CD_{50}$ of 4.4 mcg./kg.

EXAMPLE 9

Preparation of potassium 6-[α-hydroxy-α-(2-thienyl)-acetamido]penicillanate (A) α-(2-thienyl)glyoxylic acid (15.6 g.; 0.1 mole) is dissolved in a mixture of 220 ml. of dry dioxane and 44 ml. of dry acetone. Dry triethylamine (0.1 mole) was added and the solution is cooled to 0° C. with vigorous stirring, using $CaCl_2$ tubes to protect it from atmospheric moisture. Ethyl chloroformate (0.1 mole) is added with vigorous stirring at a rate such that the temperature of the mixture does not exceed 4° C. A slurry of $(CH_3CH_2)_3N \cdot HCl$ is thereby formed. The mixture is stirred at 0° C. for ½ hour.

(B) A separate solution of 6-aminopenicillanic acid (4.6 gm.; 0.1 mole) is prepared by adding a cool (5° C.) solution of triethylamine (0.1 mole) in 30 ml. of water to the 6-aminopenicillanic acid while cooling in an ice bath. A few minutes stirring produces a clear, viscous, ember-colored solution. This solution is added carefully, without stirring, to the mixture prepared in A above. Most of the 6-aminopenicillanic acid solution falls to the bottom of the flask. The mixture is then stirred for one hour at 6° to 8° C. during which time carbon dioxide is evolved. A solution of $NaHCO_3$ (0.084 mole) in 400 ml. of water, which has been cooled to 10° C., is then added to the reaction mixture with stirring. The mixture is extracted with two 320 ml. portions of ice-cold ether. The ether portions are discarded and the reaction mixture is layered by the addition of 500 ml. of cold methyl isobutyl ketone. The mixture is acidified at about 10° C. by the addition of 56 ml. of 6 N $H_2SO_4$ (0.168 mole) and is immediately transferred to a separatory funnel. The methyl isobutyl ketone layer is collected and the remaining layer is extracted with another 500 ml. of cold methyl isobutyl ketone. The two methyl isobutyl ketone extracts are combined, washed with 120 ml. of ice water, shaken with sufficient $Na_2SO_4$ to dry and filtered. To the filtrate is added potassium 2-ethylhexanoate (0.110 mole) as a 50% solution in n-butanol. The precipitated product is collected and further product is obtained as a precipitate by the addition of ether to the filtrate. The combined precipitates weigh 20.5 g. The product is determined to inhibit *Staph. aureus* Smith at a concentration of 3.1 mcg./ml.

EXAMPLE 10

Preparation of potassium 6-[α-(3-thienyl)glyoxylamido] penicillanate

The process described in Example 7, Parts B and C, is repeated except that α-(3-thienyl)glyoxylic acid [prepared from 3-acetothienone instead of 2-acethienone (2-acetylthiophene) by the procedure described in Example 7, Part A] is substituted for α-(2-thienyl)glyoxylic acid. The final product, the potassium salt of 6[α-(3-thienyl)glyoxylamido]penicillanic acid, is found to contain the β-lactam structure as shown by infrared analysis and to inhibit *Staph. aureus* Smith at concentrations of 0.001 percent by weight.

EXAMPLE 11

*Preparation of potassium 6-[α-hydroxy-α-(3-thienyl) acetamido]penicillanate*

The process described in Example 8 is repeated except that potassium 6-[α-(3-thienyl)glyoxylamido]penicillanate prepared in Example 10 is substituted for potassium 6-[α-(2-thienyl)-glyoxylamido]penicillanate. The final product, the potassium salt of 6-[α-hydroxy-α-(3-thienyl) acetamido]penicillanic acid, is found to contain the β-lactam structure as shown by infrared analysis and to inhibit Staph. aureus Smith at concentrations of 0.001 percent by weight.

EXAMPLE 12

*Preparation of potassium 6-[α-hydroxy-α-(2-thienyl) acetamido]penicillanate*

To a solution of the sodium salt of 6-aminopenicillanic acid (4.77 gm.; 0.02 mole) in 100 ml. of water and 165 ml. of dioxane, cooled to about 10° C. there is added a solution of N,N'-dicyclohexylcarbodiimide (4.13 gm.; 0.02 mole) in 50 ml. of dioxane. After about one minute, a solution of 3-thienylglycolic acid (3.48 gm.; 0.022 mole) prepared as described in S. Gronowitz, Arkiv. Kemi, 11, 519 (1957 [CA 52, 10050A (1958)] and resolved into the (+)-form as described in S. Gronowitz, Arkiv. Kemi, 13, 231–8 (1958), having a melting point of 123.5–124° C. and $[α]_D^{25}$ +102.5°, in 50 ml. of dioxane is added to the solution and the mixture is stirred with cooling for about 1½ hours. Dicyclohexylurea, which begins to precipitate about 5 minutes after the addition of the acid, is removed by filtration, washed with 25 ml. of cold water, and the filtrate is lophilized. The residue from the lyophilization is treated with 75 ml. of cold water, the pH is adjusted to 6.5 with sodium bicarbonate, and the solution is filtered to remove insoluble material. The filtrate is cooled, layered with 75 ml. of ethyl acetate, and acidified to pH 2 with 2 N phosphoric acid. The layers are separated and the aqueous layer is extracted with another 75 ml. portion of ethyl acetate. The combined ethyl acetate extracts are dried briefly over anhydrous sodium sulfate and 0.02 mole of 50% potassium 2-ethylhexanoate in n-butanol is added. The potassium salt of a diastereoisomer of 6-[α-hydroxy-α-(2-thienyl)acetamido]penicillanic acid is recovered by filtration. It is found to contain the β-lactam structure as determined by infrared analysis and to inhibit Staph. aureus Smith at a concentration of 0.001% by weight.

EXAMPLE 13

*Preparation of potassium 6-[α-hydroxy-α-(2-thienyl) acetamido]penicillanate*

The procedure of Example 12 is repeated except that 2-furylglycolic acid, prepared as described in Chem. Ber., 87, 276 (1954), was substituted for 3-thienylglycolic acid. The product, a diastereoisomer of the potassium salt of 6-[α-hydroxy-α-(2-thienyl)acetamido]penicillanic acid is found to contain a β-lactam structure as determined by infrared analysis and to inhibit Staph. aureus Smith at a concentration of 0.001% by weight.

EXAMPLE 14

In the general procedure of Example 2, Part B, the 2-thienylglyoxylic acid chloride is replaced by 0.13 mole 5-chloro-2-thienylglyoxylic acid chloride,
5-methyl-2-thienylglyoxylic acid chloride,
5-phenyl-3-chloro-2-thienylglyoxylic acid chloride,
4-orthochlorophenyl-2-thienylglyoxylic acid chloride,
5-nitrophenyl-2-thienylglyoxylic acid chloride,
3,5-dimethyl-4-ethyl-2-thienylglyoxylic acid chloride,
5-cyclohexyl-2-thienylglyoxylic acid chloride,
5-diethylamino-2-thienylglyoxylic acid chloride,
4-methylsulfonyl-2-thienylglyoxylic acid chloride,
3-ethylthio-2-thienylglyoxylic acid chloride, and
4-cycloheptyloxy-2-thienylglyoxylic acid chloride, respectively, to produce 6-(5-chloro-2-thienylglyoxylamido)penicillanic acid,
6-(5-methyl-2-thienylglyoxylamido)penicillanic acid,
6-(5-phenyl-3-chloro-2-thienylglyoxylamido)penicillanic acid,
6-(4-orthochlorophenyl-2-thienylglyoxylamido) penicillanic acid,
6-(5-nitrophenyl-2-thienylglyoxylamido)penicillanic acid,
6-(3,5-dimethyl-4-ethyl-2-thienylglyoxylamido) penicillanic acid,
6-(5-cyclohexyl-2-thienylglyoxylamido)penicillanic acid,
6-(5-diethylamino-2-thienylglyoxylamido)penicillanic acid,
6-(4-methylsulfonyl-2-thienylglyoxylamido)penicillanic acid,
6-(3-ethylthio-2-thienylglyoxylamido)penicillanic acid, and
6-(4-cycloheptyloxy-2-thienylglyoxylamido)penicillanic acid, respectively, which are isolated as their water-soluble potassium salts, and found to contain the β-lactam ring as shown by infrared analysis and to inhibit Staph. aureus Smith at concentrations of 0.001% by weight.

The substituted thienylglyoxylic acid chlorides used in the preparation of the above α-keto penicillin are prepared according to the general procedures described in Examples 2, Part A, and 7, Part B, above, or by the reaction of thionyl chloride with the appropriate substituted glyoxylic acid which may be prepared in accordance with the procedures illustrated in the literature, e.g., J. Amer. Chem. Soc., 66 1646 (1944).

EXAMPLE 15

In the general procedure of Example 3, the potassium salt of 6-(2-thienylglyoxylamido)penicillanic acid is replaced by 0.1 mole of the potassium salt of 6-(5-chloro-2-thienylglyoxylamido)penicillanic acid,
6-(5-methyl-2-thienylglyoxylamido)penicillanic acid,
6-(5-phenyl-3-chloro-2-thienylglyoxylamido)penicillanic acid,
6-(4-orthochlorophenyl-2-thienylglyoxylamido)penicillanic acid,
6-(5-nitrophenyl-2-thienylglyoxylamido)penicillanic acid,
6-(3,5-dimethyl-4-ethyl-2-thienylglyoxylamido)penicillanic acid,
6-(5-cyclohexyl-2-thienylglyoxylamido)penicillanic acid,
6-(5-diethylamino-2-thienylglyoxylamido)penicillanic acid,
6-(4-methylsulfonyl-2-thienylglyoxylamido)penicillanic acid,
6-(3-ethylthio-2-thienylglyoxylamido)penicillanic acid, and
6-(4-cycloheptyloxy-2-thienylglyoxylamido)penicillanic acid, respectively, to produce the acids 6-(5-chloro-2-thienylglycolamido)penicillanic acid,
6-(5-methyl-2-thienylglycolamido)penicillanic acid,
6-(5-phenyl-3-chloro-2-thienylglycolamido)penicillanic acid,
6-(4-orthochlorophenyl-2-thienylglycolamido)penicillanic acid.
6-(5-nitrophenyl-2-thienylglycolamido)penicillanic acid,
6-(3,5-dimethyl-4-ethyl-2-thienylglycolamido)penicillanic acid,
6-(5-cyclohexyl-2-thienylglycolamido)penicillanic acid,
6-(5-diethylamino-2-thienylglycolamido)penicillanic acid,
6-(4-methylsulfonyl-2-thienylglycolamido)penicillanic acid,
6-(3-ethylthio-2-thienylglycolamido)penicillanic acid, and
6-(4-cycloheptyloxy-2-thienylglycolamido)penicillanic acid, respectively, which are isolated as their water-soluble potassium salts, found to contain the β-lactam ring as shown by infrared analysis and to inhibit *Staph. aureus* Smith at concentrations of 0.001% by weight.

EXAMPLE 16

In the general procedure of Example 5, the 2-furylglyoxylic acid chloride is replaced by 0.13 mole 5-chloro-2-furylglyoxylic acid chloride,
5-methyl-2-furylglyoxylic acid chloride,
5-phenyl-3-chloro-2-furylglyoxylic acid chloride,
4-orthochlorophenyl-2-furylglyoxylic acid chloride,
5-nitrophenyl-2-furylglyoxylic acid chloride,
3,5-dimethyl-4-ethyl-2-furylglyoxylic acid chloride,
5-cyclohexyl-2-furylglyoxylic acid chloride,
5-diethylamino-2-furylglyoxylic acid chloride,
4-methylsulfonyl-2-furylglyoxylic acid chloride,
3-ethylthio-2-furylglyoxylic acid chloride, and
4-cycloheptyloxy-2-furylglyoxylic acid chloride, respectively, to produce 6-(5-chloro-2-furylglyoxylamido)penicillanic acid,
6-(5-methyl-2-furylglyoxylamido)penicillanic acid,
6-(5-phenyl-3-chloro-2-furylglyoxylamido)penicillanic acid,
6-(4-orthochlorophenyl-2-furylglyoxylamido)penicillanic acid,
6-(5-nitrophenyl-2-furylglyoxylamido)penicillanic acid,
6-(3,5-dimethyl-4-ethyl-2-furylglyoxylamido)penicillanic acid,
6-(5-cyclohexyl-2-furylglyoxylamido)penicillanic acid,
6-(5-diethylamino-2-furylglyoxylamido)penicillanic acid,
6-(4-methylsulfonyl-2-furylglyoxylamido)penicillanic acid,
6-(3-ethylthio-2-furylglyoxylamido)penicillanic acid, and
6-(4-cycloheptyloxy-2-furylglyoxylamido)penicillanic acid, respectively, which are isolated as their water-soluble potassium salts, and found to contain the β-lactam ring as shown by infrared analysis and to inhibit *Staph. aureus* Smith at concentrations of 0.001% by weight.

The substituted furylglyoxylic acid chlorides used in the preparation of the above α-keto penicillin are prepared according to the general procedures described in Example 4 above or by the reaction of thionyl chloride with the appropriate substituted glyoxylic acid which may be prepared in accordance with the procedures illustrated in the literature, e.g., Chem. Ber., 87, pages 276–282.

EXAMPLE 17

In the general procedure of Example 6, the potassium salt of 6-(2-furylglyoxylamido)penicillanic acid is replaced by 0.1 mole of the potassium salt of 6-(5-chloro-2-furylglyoxylamido)penicillanic acid,
6-(5-methyl-2-furylglyoxylamido)penicillanic acid,
6-(5-phenyl-3-chloro-2-furylglyoxylamido)penicillanic acid,
6-(4-orthochlorophenyl-2-furylglyoxylamido)penicillanic acid,
6-(5-nitrophenyl-2-furylglyoxylamido)penicillanic acid,
6-(3,5-dimethyl-4-ethyl-2-furylglyoxylamido)penicillanic acid,
6-(5-cyclohexyl-2-furylglyoxylamido)penicillanic acid,
6-(5-diethylamino-2-furylglyoxylamido)penicillanic acid,
6-(4-methylsulfonyl-2-furylglyoxylamido)penicillanic acid,
6-(3-ethylthio-2-furylglyoxylamido)penicillanic acid, and
6-(4-cycloheptyloxy-2-furylglyoxylamido)penicillanic acid.

respectively, to produce the acids 6-(5-chloro-2-furylglycolamido)penicillanic acid,
6-(5-methyl-2-furylglycolamido)penicillanic acid,
6-(5-phenyl-3-chloro-2-furylglycolamido)penicillanic acid,
6-(4-orthochlorophenyl-2-furylglycolamido)penicillanic acid,
6-(5-nitrophenyl-2-furylglycolamido)penicillanic acid,
6-(3,5-dimethyl-4-ethyl-2-furylglycolamido)penicillanic acid,
6-(5-cyclohexyl-2-furylglycolamido)penicillanic acid,
6-(5-diethylamino-2-furylglycolamido)penicillanic acid,
6-(4-methylsulfonyl-2-furylglycolamido)penicillanic acid,
6-(3-ethylthio-2-furylglycolamido)penicillanic acid, and
6-(4-cycloheptyloxy-2-furylglycolamido)penicillanic acid, respectively, which are isolated as their water-soluble potassium salts, found to contain the β-lactam ring as shown by infrared analysis and to inhibit *Staph. aureus* Smith at concentrations of 0.001% by weight.

EXAMPLE 18

In the general procedure of Example 7, the 2-thienylglyoxylic acid chloride is replaced by 0.13 mole 5-chloro-3-thienylglyoxylic acid chloride,
5-methyl-3-thienylglyoxylic acid chloride,
5-phenyl-3-chloro-3-thienylglyoxylic acid chloride,
4-orthochlorophenyl-3-thienylglyoxylic acid chloride,
5-nitrophenyl-3-thienylglyoxylic acid chloride,
3,5-dimethyl-4-ethyl-3-thienylglyoxylic acid chloride,
5-cyclohexyl-3-thienylglyoxylic acid chloride,
5-diethylamino-3-thienylglyoxylic acid chloride,
4-methylsulfonyl-3-thienylglyoxylic acid chloride,
3-ethylthio-3-thienylglyoxylic acid chloride, and
4-cycloheptyloxy-3-thienylglyoxylic acid chloride, respectively, to produce 6-(5-chloro-3-thienylglyoxylamido)penicillanic acid,
6-(5-methyl-3-thienylglyoxylamido)penicillanic acid,
6-(5-phenyl-3-chloro-3-thienylglyoxylamido)penicillanic acid,
6-(4-orthochlorophenyl-3-thienylglyoxylamido)penicillanic acid,
6-(5-nitrophenyl-3-thienylglyoxylamido)penicillanic acid,
6-(3,5-dimethyl-4-ethyl-3-thienylglyoxylamido)penicillanic acid,
6-(5-cyclohexyl-3-thienylglyoxylamido)penicillanic acid,
6-(5-diethylamino-3-thienylglyoxylamido)penicillanic acid,
6-(4-methylsulfonyl-3-thienylglyoxylamida)penicillanic acid,
6-(3-ethylthio-3-thienylglyoxylamido)penicillanic acid, and
6-(4-cycloheptyloxy-3-thienylglyoxylamido)penicillanic acid, respectively, which are isolated as their water-soluble potassium salts, and found to contain the β-lactam ring as shown by infrared analysis and to inhibit *Staph. aureus* Smith at concentrations of 0.001% by weight.

EXAMPLE 19

In the general procedure of Example 8, the potassium salt of 6-(2-thienylglyoxylamido)penicillanic acid is replaced by 0.1 mole of the potassium salt of 6-(5-chloro-3-thienylglyoxylamido)penicillanic acid,
6-(5-methyl-3-thienylglyoxylamido)penicillanic acid,
6-(5-phenyl-3-chloro-3-thienylglyoxylamido)penicillanic acid,
6-(4-orthochlorophenyl-3-thienylglyoxylamido)penicillanic acid,
6-(5-nitrophenyl-3-thienylglyoxylamido)pencillanic acid,
6-(3,5-dimethyl-4-ethyl-3-thienylglyoxylamido)penicillanic acid,
6-(5-cyclohexyl-3-thienylglyoxylamido)penicillanic acid,
6-(5-diethylamino-3-thienylglyoxylamido)penicillanic acid,
6-(4-methylsulfonyl-3-thienylglyoxylamido)penicillanic acid, 6-(3-ethylthio-3-thienylglyoxylamido)penicillanic acid, and
6-(4-cycloheptyloxy-3-thienylglyoxylamido)penicillanic acid, respectively to produce the acids 6-(5-chloro-3-thienylglycolamido)penicillanic acid,
6-(5-methyl-3-thienylglycolamido)penicillanic acid,
6-(5-phenyl-3-chloro-thienylglycolamido)penicillanic acid,
6-(4-orthochlorophenyl-3-thienylglycolamido)penicillanic acid,
6-(5-nitrophenyl-3-thienylglycolamido)penicillanic acid,
6-(3,5-dimethyl-4-ethyl-3-thienylglycolamido)penicillanic acid,
6-(5-cyclohexyl-3-thienylglycolamido)penicillanic acid,
6-(5-diethylamino-3-thienylglycolamido)penicillanic acid,
6-(4-methylsulfonyl-3-thienylglycolamido)penicillanic acid,
6-(3-ethylthio-3-thienylglycolamido)penicillanic acid, and
6-(4-cycloheptyloxy-3-thienylglycolamido)penicillanic acid, respectively, which are isolated as their water-soluble potassium salts, found to contain the β-lactam ring as shown by infrared analysis and to inhibit Staph. aureus Smith at concentrations of 0.001% by weight.

EXAMPLE 20

*Preparation of the potassium salt of 6-[α-phenyl-(2-thienyl) acetamido]penicillanic acid*

To 25 ml. of gently refluxing redistilled thionyl chloride (35.7 g.; 0.3 mole) there is added α-phenyl(2-thienyl)-acetic acid, prepared as described in Brown, Cook and Heilbrow J. Amer. Chem. Soc., 1949, 5113 (31.2 g.; 0.143 mole) over a twenty-minute period. The reaction mixture is heated on a steam bath for two hours and is then distilled at water pump vacuum to yield 21.1 g. of a product, α-phenylthiopropionyl chloride, having a boiling point range of 140–145° C. at water pump vacuum.

In the preparation of the penicillanic acid derivated from the acid chloride prepared as described above, 6-aminopenicillanic acid (22.7 g.; 0.105 mole) is dissolved in a solution of 18 g. of sodium bicarbonate (0.215 mole) in 225 ml. of water and the solution is cooled to about 5° C. The acid chloride, α-phenyl(2-thienyl)acetyl chloride (23.0 g.; 0.105 mole) is dissolved in 225 cc. of acetone and the resulting solution is slowly (over a thirty-minute period) added to the solution of 6-aminopenicillanic acid. The acylating reaction mixture is first stirred for thirty minutes in an ice-bath and subsequently, for ninety minutes after removal of external cooling.

After the foregoing treatment the reaction mixture is diluted with 300 ml. of ice-cold water and extracted twice with ether to remove unreacted reagents and the ether extracts are discarded. The water layer is then separated, covered with 400 ml. of ether, cooled, and acidified with 100 ml. of 6N sulfuric acid. The ether layer in which the product is contained is then separated, washed twice with cold water, dried over anhydrous sodium sulfate, filtered, and treated with 50 ml. of a 40% solution of potassium 2-ethylhexanoate in n-butanol whereupon the product, the potassium salt of 6-[α-phenyl(2-thienyl) acetamido]penicillanic acid, is precipitated and collected by filtration. After trituration with ether, this potassium salt is dried at room temperature in vacuo over $P_2O_5$, recovered as a water-soluble powder which is found to contain the β-lactam structure as shown by infrared analysis and to inhibit Staph. aureus Smith at concentrations of 0.001% by weight.

EXAMPLE 8

*Preparation of the potassium salt of 6-[α-(2-thienyl)propionamido]penicillanic acid*

The procedure of Example 20 is repeated except that α-(2-thienyl)propionic acid was substituted for α-phenyl (2-thienyl)acetic acid. The product is found to contain the β-lactam structure as shown by infrared analysis and to inhibit Staph. aureus Smith at a concentration of 0.001% by weight.

We claim:
1. A compound selected from the group consisting of the acids having the formula

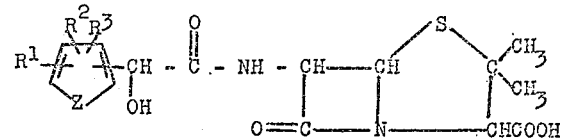

wherein Z is a member selected from the group consisting of sulfur and oxygen and wherein $R^1$, $R^2$ and $R^3$ are each a member selected from the group consisting of hydrogen, chloro, bromo, fluoro, iodo, nitro, (lower)alkyl, (lower)alkoxy, (lower)alkylthio, di(lower)alkylamino, (lower)alkanoylamino, (lower)alkanoyl, and (lower)alkylsulfonyl and the pharmaceutically acceptable nontoxic salts thereof.

2. 6 - [α - hydroxy-α-(2-thienyl)acetamido]penicillanic acid.

3. A compound selected from the group consisting of the acids having the formula

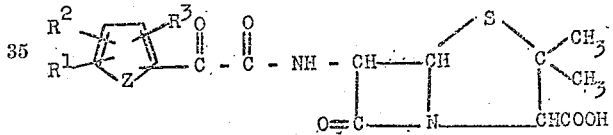

wherein Z is a member selected from the group consisting of sulfur and oxygen and wherein $R^1$, $R^2$ and $R^3$ are each a member selected from the group consisting of hydrogen, chloro, bromo, fluoro, iodo, nitro, (lower)alkyl, (lower)alkoxy, (lower)alkylthio, di(lower)alkylamino, (lower)alkanoylamino, (lower)alkanoyl, and (lower-alkyl)sulfonyl; and the pharmaceutically acceptable nontoxic salts thereof.

4. 6-(2-thienylglyoxylamino)penicillanic acid.

5. A member selected from the group consisting of the acids having the formula

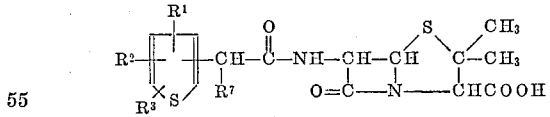

wherein $R^1$, $R^2$ and $R^3$ are each a member selected from the group consisting of hydrogen, chloro, bromo, fluoro, iodo, nitro, (lower)alkyl, (lower)alkoxy, (lower)alkylthio, di(lower)alkylamino, (lower)alkanoylamino, (lower)alkanoyl and (lower)alkylsulfonyl, and wherein $R^7$ is a member selected from the group consisting of (lower) alkyl and phenyl, and the pharmaceutically acceptable nontoxic salts thereof.

References Cited by the Examiner

Charvehe et al.: Journal American Chemical Society, vol. 84, pages 3401–02, September 1962.

NICHOLAS S. RIZZO, *Primary Examiner.*